3,332,862
Patented July 25, 1967

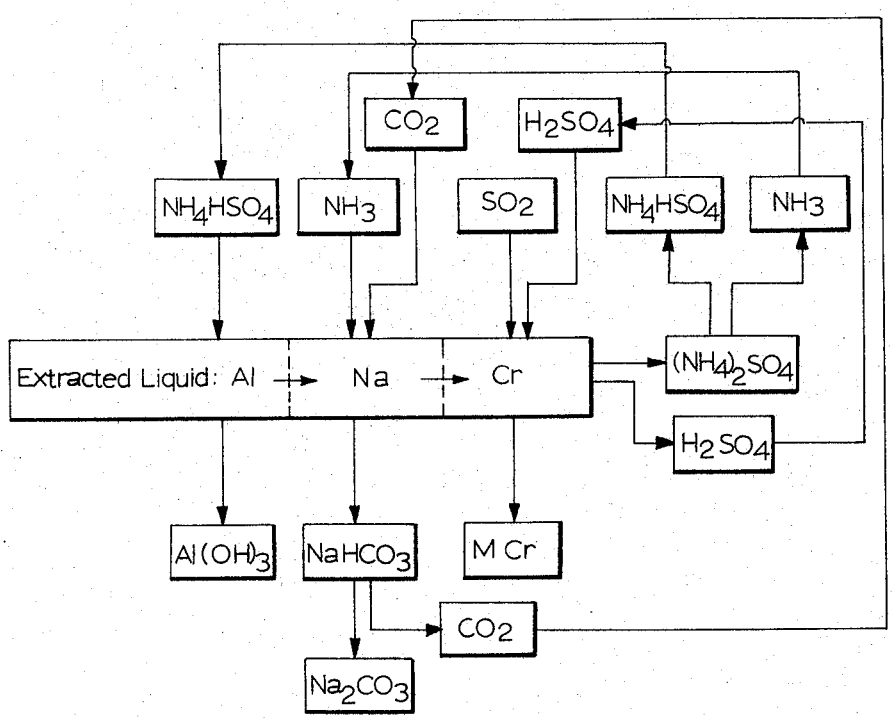

3,332,862
PROCESS FOR TREATING LIQUID EXTRACTED FROM SODA-ROASTED LATERITE
Akitoshi Ishimitsu, Takeo Furui, and Kinichi Sugahara, Kitakyushu, Japan, assignors to Yawata Iron & Steel Co., Ltd., Tokyo, Japan
Filed Feb. 7, 1964, Ser. No. 343,310
Claims priority, application Japan, Feb. 13, 1963, 38/7,062
8 Claims. (Cl. 204—105)

This invention relates generally to a process of treating the liquid, extracted from soda-roasted laterite and more particularly to a process of treatment which permits obtaining alumina, sodium bicarbonate and chrome electrolyzing material from liquid obtained by soda-roasting such iron ore as the laterite or the like.

An object of this invention is to provide a method of separating alumina, chrome and the like from such iron ores as laterite which contain Ni, Cr and Al, through application of the known soda roasting process for the purpose of their recovery.

Another object of this invention is to provide a method by which the alumina in the first stage of process, the sodium bicarbonate in the second stage, and finally the chrome electrolyzing material in the third stage, can be obtained from the extracted liquid, resulting from the known soda roasting process, applied to such iron ores as laterite, containing Ni, Cr and Al.

Another object of the present invention is to provide, in conjunction with a recovery of alumina, sodium bicarbonate and the electrolyzing material from the extracted liquid, obtained from soda-roasted iron ores such as laterite and the like, a method of treating the liquid extracted from soda-roasted laterite which makes possible repeated use of a substantial portion of such charged addition-agent as the acid ammonium sulphate, ammonia, carbonic anhydride, sulphuric acid and the like other than the sulphurous acid gas, because they can be collected for recovery throughout the course of the process, according to this invention, from residual liquid.

Other objects and a fuller understanding of the present invention may be had by referring to the following description, taken in conjunction with the accompanying drawing which is in the form of a schematic flow chart of all the related substances of the process according to this invention.

The present invention represents three consecutive stages of treating the extracted liquid, obtained from the known practice of soda roasting of such iron ores as laterite or the like containing Ni, Cr and Al, namely the first stage where the aluminum hydroxide is precipitated for removal by addition of the acid ammonium sulphate, the second stage where the sodium bicarbonate is produced by separation by carbonation under pressure, adding ammonia, and finally the third stage where chrome electrolyzing material can be obtained by addition of acid ammonium sulphate and by blowing in sulphurous acid gas, as illustrated generally, and without "balancing" the respective reaction schemes, in the following:

1st stage;

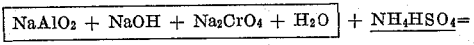

$$\text{Al(OH)}_3 + \boxed{\text{Na}_2\text{SO}_4 + \text{NH}_4\text{OH} + \text{Na}_2\text{CrO}_4} \quad (1)$$

2nd Stage;

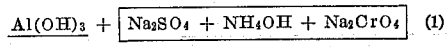

$$4\text{NaHCO}_3 + \boxed{(\text{NH}_4)_2\text{SO}_4 + (\text{NH}_4)_2\text{CrO}_4} \quad (2)$$

3rd stage;

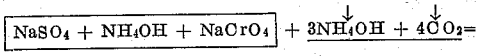

$$2(\text{NH}_4)_2\text{SO}_4 + \boxed{\tfrac{1}{2}(\text{NH}_4)_2\text{Cr}_2\text{O}_7 + \tfrac{1}{2}\text{H}_2\text{O}} \quad (3)$$

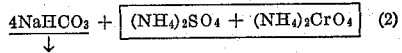

$$\boxed{\tfrac{1}{3}(\text{NH}_4)_2\text{SO}_4\text{Cr}_2(\text{SO}_4)_3 + \text{H}_2\text{O}} \quad (4)$$

Electrolytic Action:

$$\boxed{\tfrac{1}{3}(\text{NH}_4)\text{SO}_4\cdot\text{Cr}_2(\text{SO}_4)_3 + \text{H}_2\text{O}} \quad \text{(Electrolysis)}$$

$$\underset{\downarrow}{\text{Cr}} + \underset{\downarrow}{\tfrac{1}{3}(\text{NH}_4)_2\text{SO}_4} + \underset{\downarrow}{3/2\text{H}_2\text{SO}_4} \quad (5)$$

Total chemical reaction:

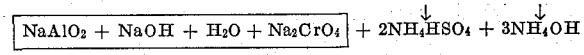 $+ 2\text{NH}_4\text{HSO}_4 + 3\text{NH}_4\text{OH}$ $$+ 4\text{CO}_2 + \tfrac{1}{2}\text{H}_2\text{SO}_4 + 3/2\text{SO}_2 = \text{Al(OH)}_3 + 4\text{NaHCO}_3 +$$
$$\qquad \qquad \qquad \qquad \qquad \qquad \qquad \qquad \qquad \downarrow \text{(a)}$$

$$5/2(\text{NH}_4)_2\text{SO}_4 + \text{Cr} + \tfrac{1}{2}\text{H}_2\text{SO}_4 + \text{H}_2\text{SO}_4$$
$$\qquad \qquad \downarrow \text{(b)} \qquad \qquad \text{Recirculation}$$

(a) $4\text{NaHCO}_3$ (Heating) $\longrightarrow$ $2\text{Na}_2\text{CO}_3 + 2\text{CO}_2 + 2\text{H}_2\text{O}$
$$\qquad \qquad \qquad \qquad \qquad \qquad \qquad \qquad \text{Recirculation}$$

(b) $5/2(\text{NH}_4)_2\text{SO}_4$ (Heating) $\longrightarrow$
$$\qquad \qquad 2\text{NH}_4\text{HSO}_4 + \tfrac{1}{2}\text{NH}_4\text{HSO}_4 + 5/2\text{NH}_4\text{OH}$$
$$\qquad \qquad \text{Recirculation} \qquad \qquad \text{Recirculation}$$

It is noted from the above description showing the involved chemical reactions that all portions of the acid ammonium sulphate and sulphuric acid and substantial portions of the ammonia and the carbonic anhydride are supplied by the ammonium sulphate and the sodium bicarbonate obtained in the process, thus permitting final successful obtainment of the aluminum hydroxide, metallic chromium, sodium carbonate, sulphuric acid and acid ammonium sulphate only by additions of sulphurous acid gas and small quantity of carbonic anhydride and the ammonium compound from outside of the system. In such a way, the present invention is characterized by a process in accordance with which the acid ammonium sulphate and ammonia as well as the sodium carbonate and carbonic anhydride can be obtained by roasting the ammonium sulphate and sodium bicarbonate produced in the process, and hydrolysis of the sodium aluminate is effected in the extracted liquid (obtained), by addition of the acid ammonium sulphate in the first stage; the sodium bicarbonate is obtained by separation due to addition of the ammonia and the carbonic anhydride in the second stage; and finally the chrome ammonium alum, sodium sulphate and the ammonium sulphate are obtained by separation due to addition of the sulphurous acid gas and the sulphuric acid in the third stage, followed by obtainment of the separated metallic chromium, sulphuric acid and ammonium sulphate by electrolysis.

Description of the present invention will be made hereunder:

1st stage;
Extracted liquid resulting from soda-roasting of laterite exhibits a high alkalinity, expressed in terms of pH value, exceeding 11, and is characterized by the following chemical contents:

Cr: 7–12, Al: 5–10, Si: 0.05–1.0, Na: 17–23 g./l.

The said liquid may be deemed as a type of mixture, set up by $Na_2CrO_4$, $NaAlO_2$, $Na_2SiO_3$, $Na_2CO_3$, $NaOH$. Of these, the sodium aluminate is hydrolyzed to produce the deposited aluminum hydroxide in a certain region of pH value of the liquid, so that for successful obtainment of the aluminum from the liquid, adjustment of pH value must properly be made.

In the aluminum refining industry, hydrolysis of the sodium aluminate has usually been achieved by a method of $CO_2$ gas addition, pursuant to which the said hydrolysis has often been carried out by recirculating the liquid, being no substantial difficulty due to the fact that the hydrolysis can not be performed thoroughly by addition of $CO_2$ gas under normal pressure. It should, however, be noted that the method in accordance with this invention where the extracted liquid which contains several elements other than aluminum is applied, and each of which has to be separated in different stages of the process, there are several problems to be solved before the $CO_2$ gas under normal pressure can be applied without any minor modification.

The present invention provides a method in accordance with which the ammonium sulphate is roasted at a suitable high temperature to produce the release of a partial portion of the ammonia which in turn gives rise to production of a mixed salt of both ammonium sulphates, acid and neutral, showing a certain level of acidity, and accordingly capable of being employed as an additive agent for separation of the aluminum hydroxide.

This practice of separation is advantageous in that, as is readily understood from the preceding chemical equation (1), the ammonia is freed and then serves as an auxiliary additive agent in the 2nd stage.

In other words, the present stage relates to a stage wherein the ammonium sulphate is roasted a temperature, in the range from 300° C. to 500° C. to obtain the acid salt and the ammonia, and another stage wherein the obtained acid salt, either in solid state or in the state of water-solution, is added to the liquid, extracted from the soda-roasted laterite, being followed by adjustment of pH value at 5–9 to hydrolyze the content of the sodium aluminate for final obtainment of aluminum hydroxide.

The following example serves to illustrate this stage of this invention.

*Example I*

The ammonium sulphate was roasted at a temperature of 400° C. for a continuous period of one hour, resulting in production of the acid salt, characterized by the mol ratio of $NH_4:SO_4 = 1.4:1.0$.

Then, the ammonium sulphate so roasted is added to the extracted liquid from the soda-roasted iron ore from which the Si content has previously been removed in a suitable manner, and adjustments are made to realize different pH values of 10, 9, 8, 7, 6, 5 and 4, and the deposit of the precipitated aluminum hydroxide was separated by filtration. The alumina contained in the filtrate and ratio of deposited silica and alumina as listed in Table 1 show that the alumina is suitable for aluminum refining.

2nd stage:

Sodium ion in the filtrate from which the aluminum content has been removed by addition of the acid ammonium sulphate in the preceding 1st stage is in equilibrium with sulphuric acid ion or chromic acid ion, and accordingly sodium bicarbonate can not be produced by addition of carbonic anhydride without a suitable additional treatment. For this reason, the ammonia which is equivalent in quantity to the sulphuric acid ion and with respect to other ions in the liquid is added to have the sodium ion freed in order to obtain sodium bicarbonate by carbonation of the filtrate.

The ammonia to be used for this addition may be either in liquid state or in gaseous state, and, as far as the 2nd stage is concerned, may be less in quantity, than that required for the 1st stage, by a quantity thereof equivalent to the quantity of the ammonia, derived from the acid ammonium sulphate, first present in the preceding stage. Therefore, the sodium bicarbonate is produced, pursuant to this invention, in such a manner in the 2nd stage that the filtrate which has been, in the preceding 1st stage, deprived of the aluminum hydroxide by precipitation as a result of addition of the acid ammonium sulphate, is concentrated to a level where the sodium sulphate is about to be first crystallized, and then is adjusted to pH value in excess of 10 by addition of aqueous solution of ammonia or causing the absorption of gaseous ammonia, and finally is permitted to absorb carbonic anhydride under pressure by means of a suitable carbonator. The sodium bicarbonate so obtained is then roasted at a temperature of 100° C. through 300° C. to produce carbonic anhydried and soda ash after filtration; the former is used for the second carbonation, and the latter is employed for soda roasting of the laterite.

The following exemplifies the second stage of the process.

*Example II*

Filtrate from which the aluminum hydroxide has been removed by addition of the acid ammonium sulphate in the 1st stage is concentrated to the following chemical content:

Cr: 10.6, Na: 31.5, $SO_4$: 123.8 g./l.

This concentrated filtrate is then permitted to absorb gaseous ammonia, and adjusted to pH value up to 10.5, an finally treated under $CO_2$ pressures of 3 kg./cm.$^2$ and 5 kg./cm.$^2$ in the autoclave for a continuous period of one hour to produce the sodium bicarbonate. Quantity of the sodium bicarbonate obtained from 1l. of the said filtrate and Na content of the same after removal of the sodium bicarbonate are as shown in Table 2.

TABLE 2

| $CO_2$ pressure (kg./cm.$^2$) | Obtained $NaHCO_3$ per 1l. of Filtrate | Na (g./l. of Filtrate) |
|---|---|---|
| 3 | 32.50 | 22.63 |
| 5 | 41.30 | 20.22 |

TABLE 1

| pH | Extracted liquid 12.0 | 10.0 | 9.0 | 8.0 | 7.0 | 6.0 | 5.0 | 4.0 |
|---|---|---|---|---|---|---|---|---|
| Filtrate, $Al_2O_3$, g./l. | 10.595 | 0.334 | 0.0446 | 0.0126 | 0.0064 | 0.0060 | 0.0075 | 0.0660 |
| Deposit, $SiO_2/Al_2O_3 \times 100$ | | 0.028 | 0.028 | 0.032 | 0.032 | 0.030 | 0.028 | 0.040 |

3rd stage;

After treatment in the 2nd stage, the filtrate shows $CrO_4^{--}$, $NH_4^+$, $Na^+$, $CO_3^{--}$ and $SO_4^{--}$ which may be reasonably considered as representing components $(NH_4)_2CrO_4$, $(NH_4)_2SO_4$, $NaHCO_3$ and $NH_4HCO_3$ Boiling of this filtrate for concentration gives rise to decomposition of both $NaHCO_3$ and $NH_4HCO_3$ and conversion of a portion of $(NH_4)_2CrO_4$ into $(NH_4)_2Cr_2O_7$. Addition of acid ammonium sulphate is then made to realize completion of conversion into $(NH_4)_2Cr_2O_7$, followed by further concentration of the filtrate up to saturation limit of the ammonium bichromate to separate both sodium sulphate and ammonium sulphate. The filtrate after this removal contains Glauber's salt, ammonium sulphate and sodium bichromate, all of which are quantitatively saturated. Then, sulphuric acid is added to the filtrate, through which sulphurous acid gas is blown in at a temperature kept below 30° C. to reduce $Cr^{6+}$ to $Cr^{3+}$, thus obtaining the purple crystallized chrome ammonium alum. After separation of the said crystal, oxidation and re-concentration are carried out according to the practice in anode oxidation or the like, in order to cause removal of the Glauber's salt and the ammonium sulphate, followed by re-reduction to obtain chrome ammonium alum. Repetition of this practice permits obtainment of the chrome ammonium alum which is a good material for chrome electrolysis. Otherwise, omitting separation of the crystallized chrome ammonium, the said filtrate is used as an electrolyte after only dilution thereof to a suitable concentration.

The following exemplifies the 3rd stage of the process.

Example III

After the 2nd stage, the filtrate is cooled for concentration to obtain 55 g. of Glauber's salt and 86 g. of ammonium sulphate (both of which are anhydrous) per litre, which are then separated. Then, adjustment is made to realize pH value of 1 by properly adding sulphuric acid to the filtrate, through which $SO_2$ gas is blown in a temperature kept at 20° C. to 25° C. to cause reduction to $Cr^{+++}$. The filtrate is then kept still for a continuous period of two full days, at the end of which 520 g. of the crystallized chrome ammonium alum was obtained.

Although we have described our invention with a certain degree of particularity, it is understood that the present disclosure has been made only by way of example and that numerous changes in the detail of practice may be resorted to without departing from the spirit and the scope of this invention.

What is claimed is:

1. In a process for treating liquid extracted from soda-roasted laterite, the improvement which comprises precipitating and separating aluminum hydroxide in a first stage by adding acid ammonium sulphate to the resultant aqueous extract, then in a second stage producing sodium bicarbonate by subjecting the liquid obtained from the first stage to carbonation under pressure and addition of ammonia, and in a third stage concentrating the reaction mixture to separate Glauber's salt and ammonium sulphate after adding acid ammonium sulphate to the liquid obtained in the second stage, and then obtaining crystallized chrome ammonium alum by passing $SO_2$ gas under pressure into the filtrate and allowing crystallization to take place.

2. In a process for treating liquid extracted from soda-roasted laterite, the improvement which comprises precipitating and separating aluminum hydroxide in a first stage by adding acid ammonium sulphate to the resultant aqueous extract, then in a second stage producing sodium bicarbonate by subjecting the liquid obtained from the first stage to carbonation under pressure and addition of ammonia, and in a third stage concentrating the reaction mixture to separate Glauber's salt and ammonium sulphate after adding acid ammonium sulphate to the liquid obtained in the second stage, and then obtaining chromium values by electrolysis of the electrolyte containing chrome passing $SO_2$ under pressure into the filtrate.

3. In a process for treating liquid extracted from soda-roasted laterite, the improvement which comprises precipitating and separating aluminum hydroxide in a first stage by adding acid ammonium sulphate to the resultant aqueous extract, then in a second stage producing sodium bicarbonate by subjecting the liquid obtained from the first stage to carbonation under pressure and addition of ammonia, and in a third stage concentrating the reaction mixture to separate Glauber's salt and ammonium sulphate after adding acid ammonium sulphate to the liquid obtained in the second stage, and then obtaining crystallized chrome ammonium alum by passing $SO_2$ gas under pressure into the filtrate and allowing crystallization to take place, a substantial portion of the carbonic acid gas obtained by roasting of the sodium bicarbonate produced in the second stage being recirculated to the second stage of the process.

4. In a process for treating liquid extracted from soda-roasted laterite, the improvement which comprises precipitating and separating aluminum hydroxide in a first stage by adding acid ammonium sulphate to the resultant aqueous extract, then in a second stage producing sodium bicarbonate by subjecting the liquid obtained from the first stage to carbonation under pressure and addition of ammonia, and in a third stage concentrating the reaction mixture to separate Glauber's salt and ammonium sulphate after adding acid ammonium sulphate to the liquid obtained in the second stage, and then obtaining crystallized chrome ammonium alum by passing $SO_2$ gas under pressure into the filtrate and allowing crystallization to take place, and a substantial portion of the acid ammonium sulphate and ammonia obtained by roasting of the ammonium sulphate separated in the third stage being recirculated into the first and second stages of the process.

5. In a process for treating liquid extracted from soda-roasted laterite, the improvement which comprises precipitating and separating aluminum hydroxide in a first stage by adding acid ammonium sulphate to the resultant aqueous extract, then in a second stage producing sodium bicarbonate by subjecting the liquid obtained from the first stage to carbonation under pressure and addition of ammonia, and in a third stage concentrating the reaction mixture to separate Glauber's salt and ammonium sulphate after adding acid ammonium sulphate to the liquid obtained in the second stage, and then obtaining crystallized chrome ammonium alum by passing $SO_2$ gas under pressure into the filtrate and allowing crystallization to take place, a substantial portion of the sulphuric acid obtained in the third stage being recirculated for re-use in the said third stage of the process.

6. In a process for treating liquid extracted from soda-roasted laterite, the improvement which comprises precipitating and separating aluminum hydroxide in a first stage by adding acid ammonium sulphate to the resultant aqueous extract, then in a second stage producing sodium bicarbonate by subjecting the liquid obtained from the first stage to carbonation under pressure and addition of ammonia, and in a third stage concentrating the reaction mixture to separate Glauber's salt and ammonium sulphate after adding acid ammonium sulphate to the liquid obtained in the second stage, and then obtaining crystallized chrome ammonium alum by passing $SO_2$ gas under pressure into the filtrate and allowing crystallization to take place, and obtaining metallic chromium by electrolyzing the chrome ammonium alum obtained in the third stage.

7. A process according to claim 1 wherein the aluminum hydroxide is precipitated by a pH of 5 to 9.

8. A process according to claim 1 wherein the second stage the liquid obtained from the first stage is first concentrated to a level of incipient crystallization of sodium sulphate and then is adjusted to a pH of more than 10 before the production of the sodium bicarbonate.

References Cited

UNITED STATES PATENTS

| | | | |
|---|---|---|---|
| 1,403,960 | 1/1922 | Hutman | 23—118 |
| 2,178,082 | 10/1939 | Rayner | 23—300 |
| 2,247,624 | 7/1941 | Wall | 23—143 |
| 2,507,475 | 5/1950 | Lloyd | 204—105 |
| 2,651,611 | 9/1953 | Carosella et al. | 204—105 |
| 2,771,413 | 11/1956 | Dean et al. | 204—105 |

JOHN H. MACK, *Primary Examiner.*

H. M. FLOURNOY, *Assistant Examiner.*